(12) United States Patent
Lee et al.

(10) Patent No.: US 12,357,906 B2
(45) Date of Patent: Jul. 15, 2025

(54) META VERSE GAME SYSTEM BASED ON BRAINWAVES

(71) Applicants: Ching Lee, New Taipei (TW); Ruey Yuan Lee, New Taipei (TW)

(72) Inventors: Ching Lee, New Taipei (TW); Ruey Yuan Lee, New Taipei (TW)

( * ) Notice: Subject to any disclaimer, the term of this patent is extended or adjusted under 35 U.S.C. 154(b) by 386 days.

(21) Appl. No.: 18/168,581

(22) Filed: Feb. 14, 2023

(65) Prior Publication Data

US 2024/0269545 A1    Aug. 15, 2024

(51) Int. Cl.
*A63F 13/212*  (2014.01)
*A63F 13/42*  (2014.01)
*A63F 13/63*  (2014.01)

(52) U.S. Cl.
CPC ............ *A63F 13/212* (2014.09); *A63F 13/42* (2014.09); *A63F 13/63* (2014.09); *A63F 2300/8082* (2013.01)

(58) Field of Classification Search
CPC .............. G06F 3/015; G06F 2203/011; A63M 2021/0027; A63M 2021/0044; A63H 2200/00; G10H 2220/376
See application file for complete search history.

(56) References Cited

U.S. PATENT DOCUMENTS

2019/0269345 A1* 9/2019 Sriram ................ A61M 21/00
2023/0218854 A1* 7/2023 Fung ..................... A63F 13/213

* cited by examiner

*Primary Examiner* — Lawrence S Galka

(57) ABSTRACT

A metaverse game system based on brainwaves is provided, in that emotional messages, voice messages and color messages are captured from the brainwaves of the gamers. The roles selected by the gamers will input to the metaverse space which is constructed by the metaverse processor so that the role can present the emotion of the gamer. Furthermore, the roles may play game in the metaverse space. In the game process, the sceneries is presented based on the states experienced by the gamer. All the processes are recorded in the record memory. Therefore, the system is applied to a multi-person game. In the whole process, the brainwave messages of each gamer can be presented completely. Further, personal character of the gamer is expressed in the role within the metaverse space. Therefore, the game exhibits a more real and interactive effects.

16 Claims, 4 Drawing Sheets

META VERSE GAME SYSTEM BASED ON BRAINWAVES

FIELD OF THE INVENTION

The present invention is related to games of metaverse, and in particular to a metaverse game system based on brainwaves.

BACKGROUND OF THE INVENTION

Currently, from the research of brainwaves, it is knows that the tightness, hearing ability, memory, logical ability, visual ability, reaction can be acquired from analysis of brainwaves. The brainwaves of human mainly include Delta wave, Theta waves, High/Low Alpha waves, High/Low Beta waves and High/Low Gamma waves of the left and right brains of the testers. These brainwaves have different physical, physiological, and psychological meanings, which expresses different conditions of the testers. Therefore, by measuring brainwaves and numerical operations thereto, characters and emotions of the users can be got. These have been widely and deeply researched academically. The operations are executed in relative semiconductor chips.

Recently, concept of Metaverse is abruptly popular all over the world. One of the important features in Metaverse is how to imitate the human characters so as to make the virtual world more approaches the real world. It is known that Helmet brainwaves detectors can get the states of the brainwaves real time. By serial tests about emotions, reactions, and preference to find characters of human is a big trend in research of brainwaves. For example, Theta waves and Low Alpha waves are helpful to find the creations and inspiration of humans. Computer games are popular for many people, while prior computer games are based on the prior art computer environments, which is independent to the metaverse and do not consider the brainwave reactions of gamers.

Therefore, since inventors of the present invention have worked in this field for many years and owns plentiful professional knowledge about these fields, they desire to propose a novel method which combines characters of brainwaves and metaverse computer games so as to provide more vivid and virtual real computer games.

SUMMARY OF THE INVENTION

Accordingly, the object of the present invention is to provide a metaverse game system based on brainwaves, wherein emotional messages, voice messages and color messages are captured from the brainwaves of the gamers. The roles selected by the gamers will input to the metaverse space which is constructed by the metaverse processor so that the role can present the emotion of the gamer. Furthermore, the roles may play game in the metaverse space. In the game process, the sceneries may be presented based on the states experienced by the gamer. All the processes are recorded in the record memory. Therefore, the system of the present invention can be applied to a multi-person game. In the whole process, the brainwave messages of each gamer can be presented completely. Further, personal character of the gamer can also be expressed in the role within the metaverse space. Therefore, the game of the present invention can exhibit a more real and interactive effects in the game.

To achieve above object, the present invention provides a A metaverse game system based on brainwaves, comprising: at least one helmet for detecting brainwaves of a gamer; in use, each helmet being worn on a head of a gamer; each helmet including a ring, a brainwave detector on the ring for detecting brainwaves, and a detector transceiver connected to the brainwave detector for transmitting the brainwaves from the brainwave detector; at least one processor transceiver connected to a detector transceiver of a respective one helmet for receiving signals from the detector transceiver; at least one gamer processing unit connected to a respective one processor transceiver receiving the brainwave signals from the processor transceiver and processing the signals; these brainwave signals including signal of brainwaves from the left brain and right brain of the gamer, which contains Delta wave, Theta waves, High/Low Alpha waves, High/Low Beta waves and High/Low Gamma waves;

The gamer processing unit includes a melody convertor for converting the brainwave signals of the gamer into respective music melodies by a predetermined algorithm which is mainly based on the variations of Delta wave, Theta waves, High/Low Alpha waves, High/Low Beta waves and High/Low Gamma waves, and attention levels and meditation levels of the left and right brains of the gamer; a color convertor for converting brainwave signals of the gamer into respective colors according to predetermined algorithms which is based on the psychological states acquired from the brainwaves; a metaverse processor connected to the gamer processing unit for constructing a metaverse space; the metaverse processor including the following elements; a role arrangement unit including a role database; the role database storing roles using in the game; the role arrangement unit receiving roles selected by the gamers and in the role database; the roles selected by the gamer being a role which is played by the gamer in a metaverse space; the role selected being inputted to the metaverse space; a scenery database connected to a scenery input unit; the scenery database storing various sceneries; the gamer can select sceneries for being presented in the metaverse space; a scenery player connected to at least one gamer processing unit and the scenery database for displaying sceneries selected by a gamer to the metaverse space; in the game process, the scenery player plays different sceneries based on the process of the gamer in the metaverse space; a game rule database storing predetermined gamer rules, and program codes for guiding the gamer to play the game based on these gamer rules; and a gamer object database storing various objects used in the game; in the gaming process, these objects being presented in the metaverse space, which are varied with the process of the game.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 5, the metaverse game system based on brainwave of the present invention is illustrated. The present invention includes the following elements.

Figure 1:
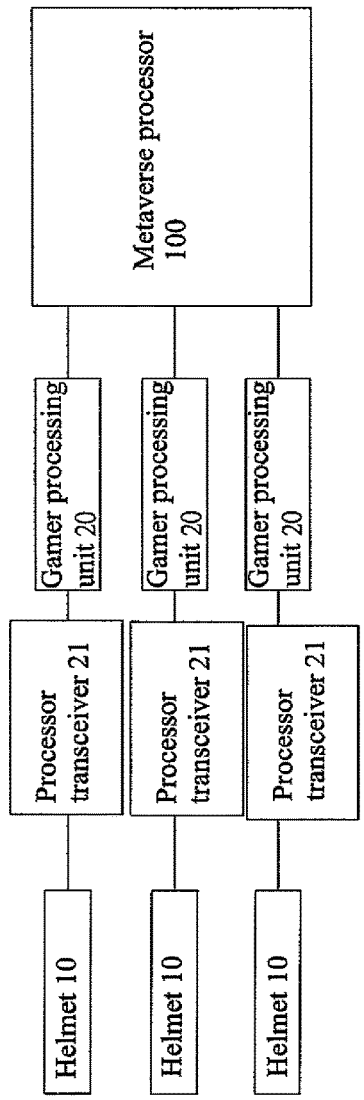
FIG. 1 is a structural block diagram of the main elements of the present invention.
Figure 2:
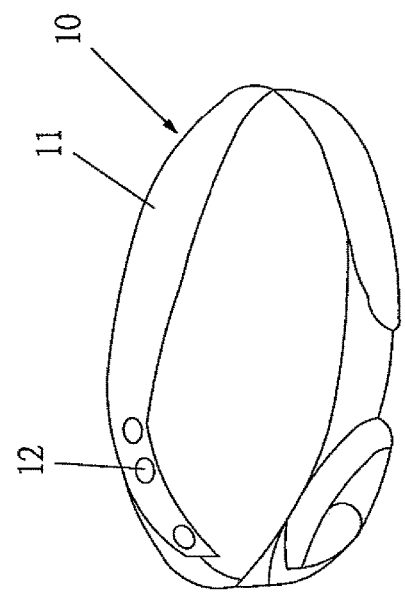
FIG. 2 is a schematic view showing the helmet of the present invention.

At least one helmet 10 serves to detect brainwaves of a gamer. In use, each helmet 10 is worn on the head of a gamer, as illustrated in FIGS. 1 and 2. Each the helmet 10 includes a ring 11, a brainwave detector 12 on the ring 11 for detecting brainwaves, and a detector transceiver 14 connected to the brainwave detector 12 for transmitting the brainwaves from the brainwave detector 12.

Each helmet 10 further includes an attention and meditation calculator 15 connected to the brainwave detector 12 for calculating the attention level and meditation level of the gamer by known algorithm (which is known in the prior art and thus the details will not be further described herein), and the attention level and the medication level are transmitted out through the detector transceiver 14 thereof.

At least one processor transceiver 21 is connected to a detector transceiver 14 of a respective one helmet 10 for receiving signals from the detector transceiver 14.

Figure 4:
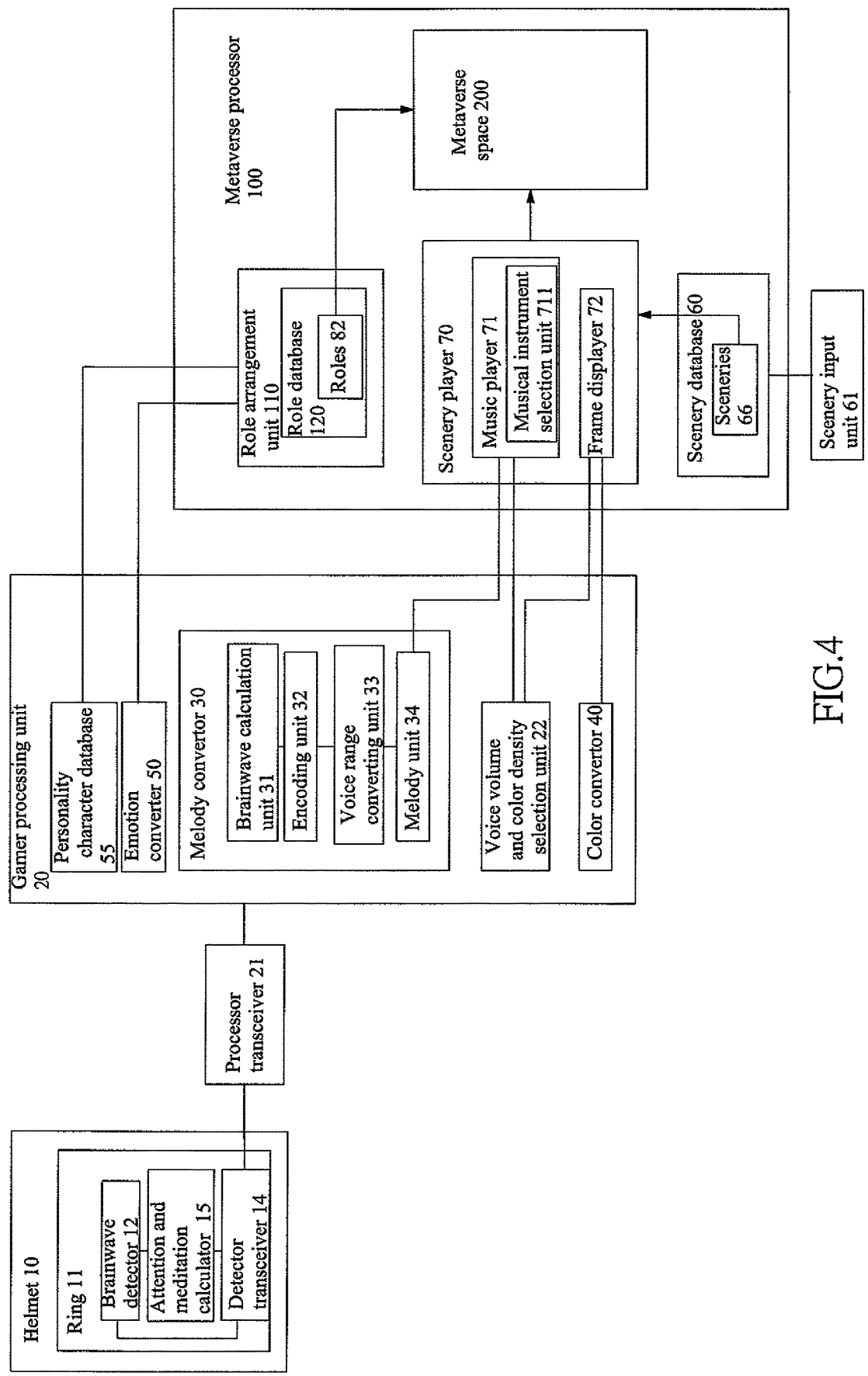
FIG. 4 is a schematic view showing the system of the present invention, where the elements of the melody converter are illustrated.

At least one gamer processing unit 20 connected to a respective one processor transceiver 21 receives the brainwave signals from the processor transceiver 21 and processing the signals. These brainwave signals includes signal of brainwaves from the left brain and right brain of the gamer, which contains Delta wave, Theta waves, High/Low Alpha waves, High/Low Beta waves and High/Low Gamma waves. The gamer processing unit 20 may be installed in various electronic devices, such as computers, mobile phones, or tablet computers, etc.;

The gamer processing unit 20, as illustrated in FIGS. 2 and 4, includes the following elements.

A melody convertor 30 serves for converting the brainwave signals of the gamer into respective music melodies by a specific algorithm which is mainly based on the variations of Delta wave, Theta waves, High/Low Alpha waves, High/Low Beta waves and High/Low Gamma waves, and attention levels and meditation levels of the left and right brains of the user.

A color convertor 40 serves for converting brainwave signals of the gamer into specific colors according to specific algorithms which is based on the psychological states acquired from the brainwaves. For example, when the brainwaves show an anxiety state, a deep sink jitter color state is presented. When the brainwaves show that the gamer is in a low emotion state, grey like colors are presented.

An emotion converter 50 serves for acquiring customer's emotions by received brainwaves of the gamer in a specific period.

A personality character database 55 is connected to the gamer processing unit 20 for storing personality characters acquired from the brainwaves of gamers. Converting of personality characters being well known in the prior art and thus the details will not be described herein.

A metaverse processor 100 is connected to the gamer processing unit 20 for constructing a metaverse space 200. The metaverse processor 100 includes the following elements.

A role arrangement unit 110 includes a role database 120. The role database 120 stores roles 82 using in the game. The role arrangement unit 110 receives roles selected by the gamers and in the role database 120. The roles 82 selected by the gamer is a role which is played by the gamer in a metaverse space 200. The role selected is inputted to the metaverse space 200. The role 82, is, for example, a real person, a doll, an animal, a carton, etc. Therefore, the role 82 selected by the gamer is presented in the metaverse space 200 and represents the gamer.

The role arrangement unit 110 is connected to the emotion converter 50 and the personality character database 55 of the gamer processing unit 20. The emotion converter 50 input emotions of the gamer in different time to the role 82 selected by the gamer so that the role 82 may express the emotion. When a gamer selected a role 82, the role arrangement unit 110 acquires the personality characters of the gamer from the personality character database 55 and the personality characters are used to modify the role 83 selected by the gamer. The modification may be a static modification, which is not varied with time, moreover, the modification may be dynamic, which is varied with the expression of the role 82 in the metaverse space.

A scenery database 60 is connected to a scenery input unit 61. The scenery database 60 stores various sceneries. The gamer could select desired sceneries for being presented in the metaverse space 200.

A scenery input unit 61 receives various sceneries 66 inputted and stores sceneries 66 to the scenery database 60

A scenery player 70 is connected to at least one gamer processing unit 20 and the scenery database 60 for displaying sceneries selected by a gamer to the metaverse space 200. In the game process, the scenery player 70 plays different sceneries based on the process of the gamer in the metaverse space. The scenery player 70 plays musics and melodies from the melody convertor 30, color messages from the color convertor 40, and the sceneries outputted from the scenery database 60. The states of the sceneries 66 will change based on the outputs from the melody convertor 30 and the color convertor 40.

The metaverse processor 100 presents roles 82 and sceneries 66 in the metaverse space 200 by augmented reality (AR) so that the role 82 and the sceneries 66 are combined with real world and thus the gamer may interact between the metaverse and the real world.

The metaverse processor 100 presents roles 82 and sceneries 66 in the metaverse space 200 by virtual reality (VR) so that the role 82 and the sceneries 66 present in a three dimensional virtual world. Furthermore, the data about the feeling is provided to the gamer so that the gamer feels that he or she is as in the virtual world.

By above mentioned construction, the gamer may selects a scenery 66 in the scenery database 60 which is presented in the space of the gamer in the metaverse space 200. For example, as the scenery 66 is an indoor scenery, it expresses that the gamer is lived within a house.

Figure 3:
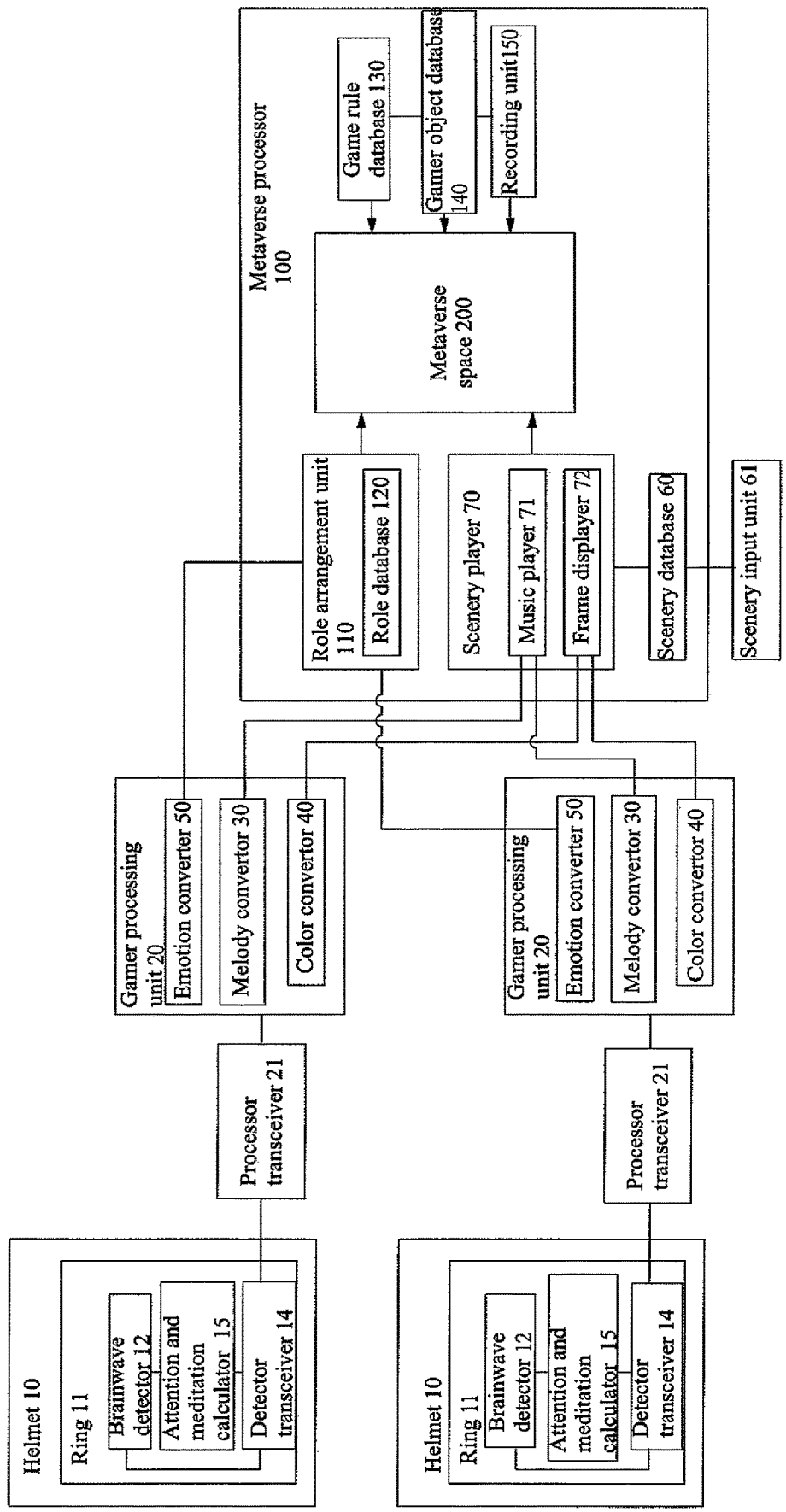
FIG. 3 is a schematic view showing the system structural function block diagram of the present invention.

As illustrated in FIG. 3, the metaverse processor 100 further includes:

A game rule database 130 stores specific gamer rules, and program codes for guiding the gamer to play the game based on these gamer rules.

A gamer object database 140 stores various objects used in the game. In the gaming process, these objects are presented in the metaverse space 200, which are varied with the process of the game.

A recording unit 150 stores related data in the game, for instance, personal data of gamers, scores in the game, historic data, data files stored during the game processes, etc.

By above mentioned ways, each game can wear the helmet 10 to acquire the brainwaves which is then inputted to the gamer processing unit 20 so as to enter into the metaverse space 200. The roles selected by the gamer from the role arrangement unit 110 are placed into the metaverse space 200. The metaverse space 200 may present sceneries through augmented reality or virtual reality. The emotion converter 50 inputs emotions of the gamers to the role 82. In the game process, the scenery player 70 may play respective sceneries 66 based on the state of the gamer in the metaverse space 200. The process of the game is guided based on the game rules in the gamer rule database 130 and all the processes are recorded in the record unit 150.

Figure 5:
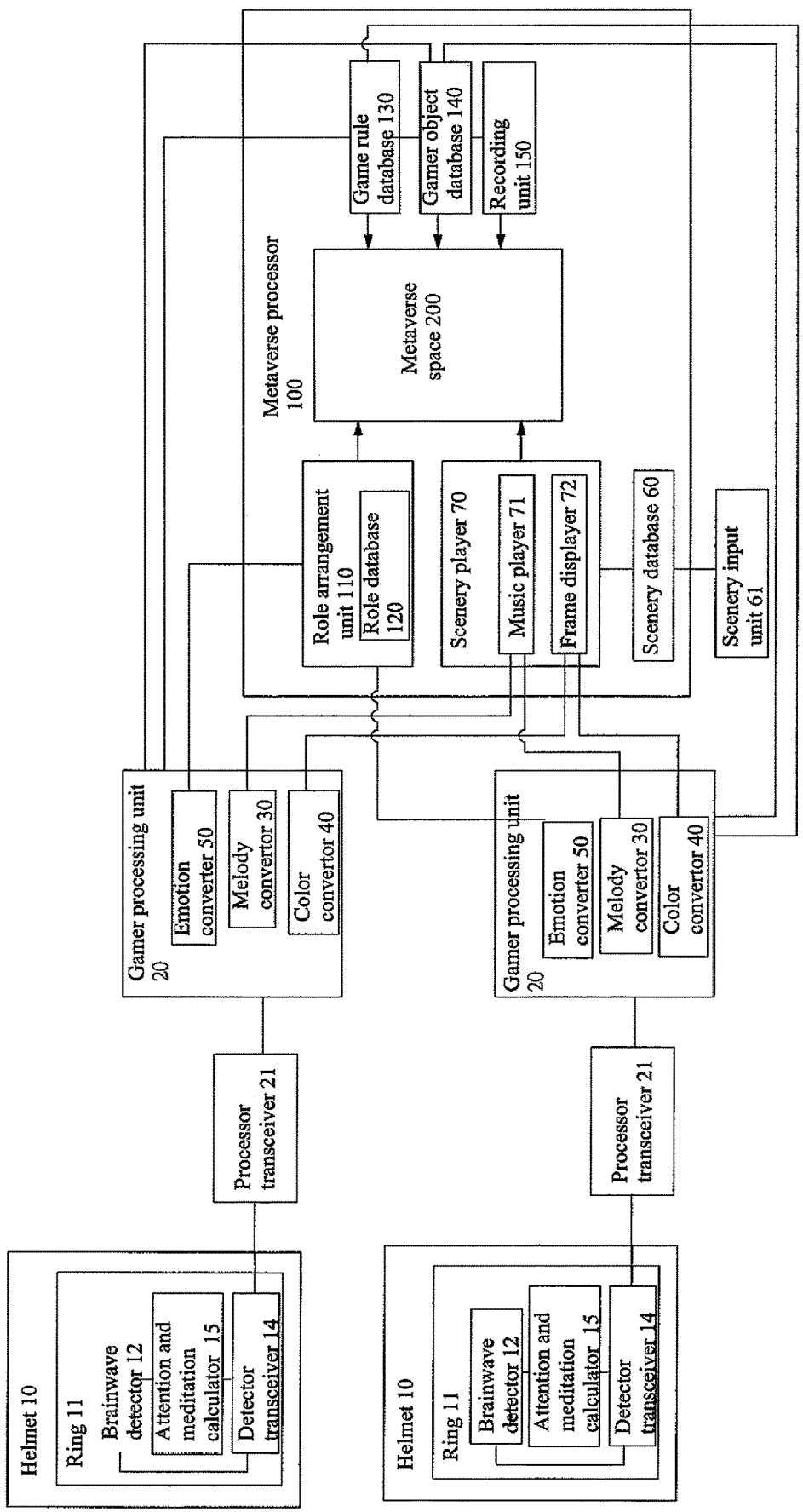
FIG. 5 is another system block diagram of the present invention.

FIG. 5 shows another structure of the present invention, wherein the game rule database 130 is further connected to the gamer processing unit 20. The game rules may be set based on the brainwaves stored in the gamer processing unit 20 for matching the states of various gamers so as to increase the variations and interesting in the game. The game rule database 140 is further connected to the gamer processing unit 20. The game object database 140 provides various objects of the game based on the brainwaves of the gamers in the gamer processing unit 20.

The melody convertor 30 further comprises the following elements.

A brainwave calculation unit 31 serves to calculate brainwave strength difference between two adjacent time points for various brainwave parameters of the gamers, wherein the brainwave parameter is selected from Att, Med, δ, θ, α−, α+, β−, β+, γ−, γ+, where the Att means the attention level, Med means the meditation level, and δ means Delta waves, θ means Theta waves, α− means Low Alpha waves, α+ means High Alpha waves, β− means Low Beta waves, β+ means High Beta waves, γ− means Low Gamma waves, and γ+ means High Gamma waves.

An encoding unit 32 is connected to the brainwave calculation unit 31, wherein the variations of the strength differences of the brainwaves in different time periods with respect to the brainwave parameters are encoded into respective coding values.

A voice range converting unit 33 is connected to the encoding unit 32. Based on values of the attention level and meditation level for each time period, by specific converting rules, the coding values are converted into respective notes, pitches, beats in that time period.

A melody unit 34 is connected to the voice range conversion unit 33 for arranging the notes of different time period converted from the voice range conversion unit 33 based on specific sequence so as to build music melodies in various time periods. Then the melodies are outputted.

The scenery player 70 includes a music player 71 for playing the melody from the melody converter 30 of the gamer processing unit 20 and a frame displayer 72 connected to the color convertor 40 of the gamer processing unit 20 for displaying colors from the color convertor 40. The music player 71 could play melody from the melody convertor 30 by MIDI formats.

The melody convertor 71 further includes a musical instrument selection unit 711 for selection of the musical instrument from the gamer and the timbre of the music instrument is used to play the melody determined above. Therefore, when there are many gamers, various music instruments are selected and combined to play the melodies from these users.

The color conversion unit 50 serves to map different sections of the brainwaves to different colors, wherein Delta wave is mapped to white color, Theta is mapped to red color, Low Alpha is mapped to orange color, High Alpha is mapped to yellow color, Low Beta is mapped to green color, High Beta is mapped to blue color, Low Gamma is mapped to indigo color, and High Gamma is mapped to purple color. When the music player 71 plays musics, it transfers respective colors to the frame displayer 72 based on the brainwave sections corresponding to the notes.

The processing unit 20 further includes a voice volume and color density selection unit 22 which is connected to the music player 71 and the frame displayer 72. The amplitudes of the brainwaves in different time periods are divided into different sections which are mapped to different voice volumes and color densities for controlling the volume the music player 71 and color density of the frame displayer 72.

Advantages of the present invention are that emotional messages, voice messages and color messages are captured from the brainwaves of the gamers. The roles selected by the gamers will input to the metaverse space which is constructed by the metaverse processor so that the role can present the emotion of the gamer. Furthermore, the roles may play game in the metaverse space. In the game process, the sceneries may be presented based on the states experienced by the gamer. All the processes are recorded in the record memory. Therefore, the system of the present invention can be applied to a multi-person game. In the whole process, the brainwave messages of each gamer can be presented completely. Further, personal character of the gamer can also be expressed in the role within the metaverse space. Therefore, the game of the present invention can exhibit a more real and interactive effects in the game.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A metaverse game system based on brainwaves, comprising:
   at least one helmet for detecting brainwaves of a gamer; each helmet being worn on a head of a gamer; a brainwave detector serving for detecting brainwaves, and a detector transceiver connected to the brainwave detector for transmitting the brainwaves from the brainwave detector;
   at least one processor transceiver connected to a detector transceiver of a respective one helmet for receiving signals from the detector transceiver;
   at least one gamer processing unit connected to a respective one processor transceiver receiving the brainwave signals from the processor transceiver and processing the signals; these brainwave signals including signal of brainwaves from the left brain and right brain of the gamer, which contains Delta wave, Theta waves, High/Low Alpha waves, High/Low Beta waves and High/Low Gamma waves;
   the gamer processing unit including:
   a melody convertor for converting the brainwave signals of the gamer into respective music melodies by a predetermined algorithm which is mainly based on the variations of Delta wave, Theta waves, High/Low Alpha waves, High/Low Beta waves and High/Low Gamma waves, and attention levels and meditation levels of the left and right brains of the gamer;
   a color convertor for converting brainwave signals of the gamer into respective colors according to predetermined algorithms which is based on the psychological states acquired from the brainwaves;

a metaverse processor connected to the gamer processing unit for constructing a metaverse space; the metaverse processor including the following elements;

a role arrangement unit including a role database; the role database storing roles using in the game; the role arrangement unit receiving roles selected by the gamers and in the role database; the roles selected by the gamer being a role which is played by the gamer in a metaverse space; the role selected being inputted to the metaverse space;

a scenery database connected to a scenery input unit; the scenery database storing various sceneries; the gamer can select sceneries for being presented in the metaverse space;

a scenery player connected to at least one gamer processing unit and the scenery database for displaying sceneries selected by a gamer to the metaverse space; in the game process, the scenery player plays different sceneries based on the process of the gamer in the metaverse space; and a game rule database storing predetermined gamer rules, and program codes for guiding the gamer to play the game based on these gamer rules; and a gamer object database storing various objects used in the game; in the gaming process, these objects being presented in the metaverse space, which are varied with the process of the game;

an emotion converter for acquiring customer's emotions by received brainwaves of the gamer in a specific period; and a personality character database connected to the gamer processing unit for storing personality characters acquired from the brainwaves of gamers.

2. The metaverse game system based on brainwaves as claimed in claim 1, wherein the game rule database is further connected to the gamer processing unit; the game rules is set based on the brainwaves stored in the gamer processing unit for matching states of various gamers; the game rule database is further connected to the gamer processing unit; and the game object database provides various objects of the game based on the brainwaves of the gamers in the gamer processing unit.

3. The metaverse game system based on brainwaves as claimed in claim 1, wherein a recording unit stores related data in the game during the game processes.

4. The metaverse game system based on brainwaves as claimed in claim 1, further comprising a recording unit related data in the game, which includes, personal data of gamers, scores in the game, historic data, and data files stored during the game processes.

5. The metaverse game system based on brainwaves as claimed in claim 1, wherein the role selected is inputted to the metaverse space; and the role is selected from a real person, a doll, an animal, and a carton.

6. The metaverse game system based on brainwaves as claimed in claim 1, wherein a scenery database is connected to a scenery input unit; the scenery database stores various sceneries; and the scenery input unit receives various sceneries inputted and stores sceneries to the scenery database.

7. The metaverse game system based on brainwaves as claimed in claim 1, wherein the metaverse processor presents roles and sceneries in the metaverse space by augmented reality (AR) so that the role and the sceneries are combined with real world and thus the gamer interacts between the metaverse and the real world.

8. The metaverse game system based on brainwaves as claimed in claim 1, wherein the metaverse processor presents roles and sceneries in the metaverse space by virtual reality (VR) so that the role and the sceneries presented in a three dimensional virtual world.

9. The metaverse game system based on brainwaves as claimed in claim 1, wherein the role arrangement unit is connected to the emotion converter and the personality character database of the gamer processing unit; the emotion converter inputs emotions of the gamer in different time to the role selected by the gamer so that the role expresses the emotion; when a gamer selected a role, the role arrangement unit acquires the personality characters of the gamer from the personality character database and the personality characters are used to modify the role selected by the gamer; and the modification is a static modification, which is not varied with time, moreover, the modification is a dynamic modification, which is varied with the expression of the role in the metaverse space.

10. The metaverse game system based on brainwaves as claimed in claim 1, wherein the scenery player plays music and melodies from the melody convertor, color messages from the color convertor, and the sceneries outputted from the scenery database; the states of the sceneries will change based on the outputs from the melody convertor and the color convertor.

11. The metaverse game system based on brainwaves as claimed in claim 1, wherein each helmet further includes an attention and meditation calculator connected to the brainwave detector for calculating the attention level and meditation level of the gamer by known algorithm, and the attention level and the medication level are transmitted out through the detector transceiver thereof.

12. The metaverse game system based on brainwaves as claimed in claim 1, wherein the melody convertor 30 further comprises:

a brainwave calculation unit for calculating brainwave strength difference between two adjacent time points for various brainwave parameters of the gamers, wherein the brainwave parameter is selected from Att, Med, $\delta$, $\theta$, $\alpha-$, $\alpha+$, $\beta-$, $\beta+$, $\gamma-$, $\gamma+$, where the Att means the attention level, Med means the meditation level, and $\delta$ means Delta waves, $\theta$ means Theta waves, $\alpha-$ means Low Alpha waves, $\alpha+$ means High Alpha waves, $\beta-$ means Low Beta waves, $\beta+$ means High Beta waves, $\gamma-$ means Low Gamma waves, and $\gamma+$ means High Gamma waves;

an encoding unit connected to the brainwave calculation unit, wherein variations of the strength differences of the brainwaves in different time periods with respective to the brainwave parameters are encoded into respective coding values;

a voice range converting unit connected to the encoding unit; based on values of the attention level and meditation level for each time period, by specific converting rules, the coding values are converted into respective notes, pitches, beats in that time period; and a melody unit connected to the voice range conversion unit for arranging the notes of different time period converted from the voice range conversion unit based on specific sequence so as to build music melodies in various time periods; and then the melodies are outputted.

13. The metaverse game system based on brainwaves as claimed in claim 1, wherein the scenery player includes a music player for playing the melody from the melody converter of the gamer processing unit and a frame displayer connected to the color convertor of the gamer processing unit for displaying colors from the color convertor; the music player plays melody from the melody convertor by MIDI formats.

14. The metaverse game system based on brainwaves as claimed in claim 13, wherein the melody convertor further includes a musical instrument selection unit for selection of the musical instrument by the gamer and the timbre of the music instrument is used to play the melody determined above.

15. The metaverse game system based on brainwaves as claimed in claim 13, wherein the color conversion unit serves to map different sections of the brainwaves to different colors, wherein Delta wave is mapped to white color, Theta is mapped to red color, Low Alpha is mapped to orange color, High Alpha is mapped to yellow color, Low Beta is mapped to green color, High Beta is mapped to blue color, Low Gamma is mapped to indigo color, and High Gamma is mapped to purple color; when the music player plays musics, it transfers respective colors to the frame displayer based on the brainwave sections corresponding to the notes.

16. The metaverse game system based on brainwaves as claimed in claim 13, wherein the processing unit further includes a voice volume and color density selection unit which is connected to the music player and the frame displayer; the amplitudes of the brainwaves in different time periods are divided into different sections which are mapped to different voice volumes and color densities for controlling the volume the music player and color density of the frame displayer.

* * * * *